United States Patent
Misumi et al.

(10) Patent No.: US 6,492,484 B2
(45) Date of Patent: Dec. 10, 2002

(54) POLYCARBODIIMIDE

(75) Inventors: Sadahito Misumi, Ibaraki (JP); Yuji Hotta, Ibaraki (JP); Akiko Matsumura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/941,559

(22) Filed: Aug. 30, 2001

(65) Prior Publication Data

US 2002/0055606 A1 May 9, 2002

(30) Foreign Application Priority Data

| Sep. 1, 2000 | (JP) | 2000-264966 |
| Sep. 29, 2000 | (JP) | 2000-299276 |
| Mar. 14, 2001 | (JP) | 2001-072074 |

(51) Int. Cl.[7] ............ C08G 73/00; C08G 18/00; C07C 331/00

(52) U.S. Cl. ............ 528/170; 528/44; 528/45; 528/48; 528/52; 528/196; 528/310; 528/322; 528/351; 528/353; 525/907; 428/473.5

(58) Field of Search ............ 528/170.35, 310, 528/322, 44.52, 45, 48, 196, 353; 525/907; 428/473.5

(56) References Cited

U.S. PATENT DOCUMENTS

| 6,090,906 A | * | 7/2000 | Amano et al. ............ 528/170 |
| 6,107,448 A | * | 8/2000 | Sakamoto et al. ............ 528/310 |
| 6,121,406 A | * | 9/2000 | Imashiro et al. ............ 528/170 |
| 6,180,261 B1 | * | 1/2001 | Inoue et al. ............ 428/626 |
| 6,248,857 B1 | * | 6/2001 | Misumi et al. ............ 528/170 |

FOREIGN PATENT DOCUMENTS

| JP | 8-208788 | 8/1996 |

\* cited by examiner

*Primary Examiner*—P. Hampton-Hightower
(74) *Attorney, Agent, or Firm*—Birch, Stewart, Kolasch & Birch, LLP

(57) ABSTRACT

A polycarbodiimide represented by the formula (I):

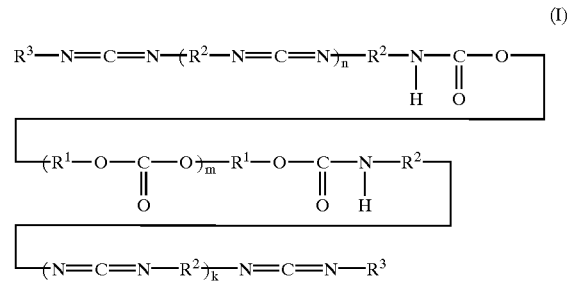

wherein $R^1$ is an alkylene group having 2 to 10 carbon atoms, $R^2$ is a divalent aromatic group, $R^3$ is a monovalent aromatic group, k is 0 or an integer of 1 to 30, m is an integer of 2 to 100, and n is 0 or an integer of 1 to 30, a process for preparing the same and uses of the polycarbodiimide. The polycarbodiimide is favorably used in the form of films such as adhesive films for die bonding and adhesive films for underfilling, which can be used in semiconductor devices.

13 Claims, 8 Drawing Sheets

POLYCARBODIIMIDE

BACKGROUND OF THE INVENTION

1. Field of the Invention

The present invention relates to a polycarbodiimide. More specifically, the present invention relates to a polycarbodiimide and its uses, and a process for preparing the polycarbodiimide.

2. Discussion of the Related Art

An aromatic polycarbodiimide has been used in flame-proof films and heat-resistant adhesives since the aromatic polycarbodiimide has excellent heat resistance. As the aromatic polycarbodiimide, those prepared by polymerizing monomers such as diphenylmethane diisocyanate (MDI) and tolylene diisocyanate (TDI) have been known.

A film made of the aromatic polycarbodiimide generally has a characteristic such that a volatile gas or a decomposed monomer is not generated from the film even at high temperatures of not less than 400° C.

However, the flexibility of the film is lowered due to self-cross-linking when heat of not less than 200° C. is applied to the film for a long period of time, and the film is not suitable for applications requiring bending because its flexural modulus is so high.

In the process for producing a semiconductor device, a semiconductor chip is bonded to a lead frame or an electrode by coating a paste such as silver paste on a die pad of a lead frame, mounting a semiconductor chip thereon, and curing the paste.

However, since the paste cures even at room temperature, the amount of paste coated changes due to the increase of its viscosity and variation in shape of the paste would be caused during coating, so that variation in reliability of the bonding strength of the semiconductor chip would be caused. For instance, when the amount of the paste coated is changed and insufficient, the bonding strength between the semiconductor chip and the electrode is lowered, so that the semiconductor chip can be peeled off during the subsequent wire bonding step. On the other hand, when the amount of the paste coated is too large, the paste flows onto the semiconductor chip, so that the yield and the reliability can be lowered. Such defects are even more remarkable for large-sized semiconductor chip, and in order to ensure the reliability of the bonding strength, the amount of coating of the paste should be frequently adjusted, so that there often causes hindrance in workability and productivity.

Recently, in order to achieve the improvement in properties of a semiconductor device, there has been employed a process comprising pouring a liquid thermosetting resin so-called "underfilling material" in a gap between a semiconductor element and a wiring circuit substrate, curing the thermosetting resin to form a resin-cured product, to distribute stress concentrated to an electric connection part into the resin-cured product, thereby improving the reliability of the connection.

However, in order to pour the liquid thermosetting resin between the semiconductor element and the wiring circuit substrate, it is necessary to provide a space for positioning a pouring nozzle near the mounting position of the semiconductor element. With the advancement of miniaturization and thinning of the semiconductor element, it would be difficult to secure the space for positioning a pouring nozzle. Therefore, improvement in the pouring (underfilling) step of the liquid resin has been earnestly desired.

An object of the present invention is to provide a polycarbodiimide which is excellent in flexibility when formed into a film, and maintains low flexural modulus without lowering its flexibility even when the polycarbodiimide is heated at a temperature of not less than 200° C. for a long period of time.

Another object of the present invention is to provide an adhesive film for die bonding which gives a stable bonding strength with no variance in the amount of the film during bonding of a semiconductor chip to an electrode and which is excellent in workability and productivity during processing.

In addition, an object of the present invention is to provide an adhesive film for underfilling which is excellent in relaxation of stress caused in the semiconductor element, the wiring circuit substrate and the connecting electrode, and excellent in reliability of electric connection between the semiconductor element and the wiring circuit substrate, and a semiconductor device in which the adhesive film for underfilling is used as a sealing resin.

These and other objects of the present invention will be apparent from the following description.

SUMMARY OF THE INVENTION

According to the present invention, there are provided:

(1) a polycarbodiimide represented by the formula (I):

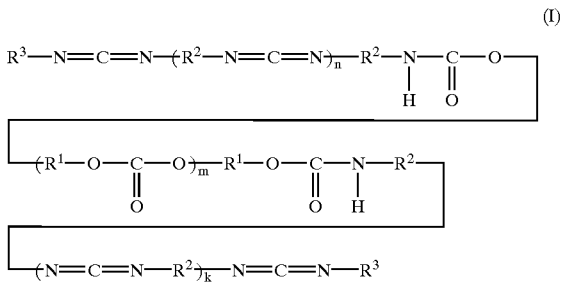

wherein $R^1$ is an alkylene group having 2 to 10 carbon atoms, $R^2$ is a divalent aromatic group, $R^3$ is a monovalent aromatic group, k is 0 or an integer of 1 to 30, m is an integer of 2 to 100, and n is 0 or an integer of 1 to 30;

(2) a film made of the above-mentioned polycarbodiimide;

(3) an adhesive film for die bonding, made of the above-mentioned polycarbodiimide;

(4) a semiconductor device comprising a semiconductor chip and an electrode, wherein the semiconductor chip is bonded to the electrode with the aid of the above-mentioned adhesive film for die bonding;

(5) an adhesive film for underfilling, made of the above-mentioned polycarbodiimide;

(6) a semiconductor device comprising a semiconductor element and a wiring circuit substrate, wherein a gap formed between the semiconductor element and the wiring circuit substrate is sealed with the above-mentioned adhesive film for die bonding; and (7) a process for preparing a polycarbodiimide represented by the formula (I), comprising the steps of:
reacting a polycarbonate diol represented by the formula (II):

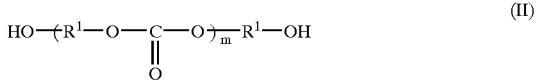

(II)

wherein $R^1$ and m are as defined above, with an aromatic diisocyanate in the ratio of not less than 2 mol of the aromatic diisocyanate per one mol of the polycarbonate diol to give a polyurethane having isocyanate groups at both ends; and carbodiimidating isocyanate groups existing at both ends of the resulting polyurethane with the residual aromatic diisocyanate in the presence of a catalyst.

DETAILED DESCRIPTION OF THE INVENTION

Figure 1:
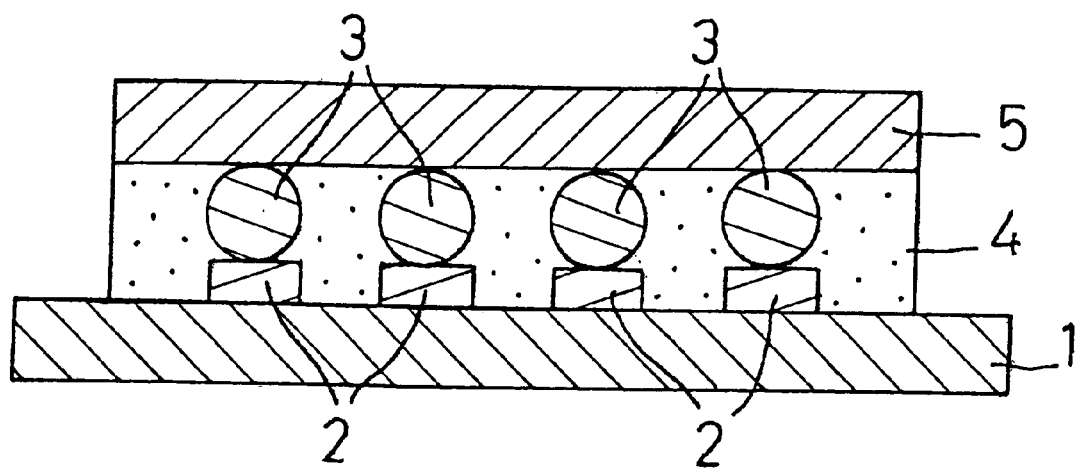
FIG. 1 is a schematic view showing one embodiment of the semiconductor device of the present invention.

The polycarbodiimide of the present invention can be prepared by the steps of reacting a polycarbonate diol represented by the formula (II):

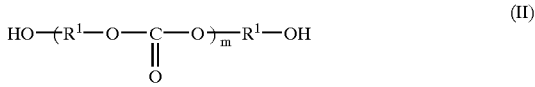

(II)

wherein $R^1$ is an alkylene group having 2 to 10 carbon atoms, and m is an integer of 2 to 100, with an aromatic diisocyanate in the ratio of not less than 2 mol of the aromatic diisocyanate per one mol of the polycarbonate diol to give a polyurethane having isocyanate groups at both ends; and carbodiimidating isocyanate groups existing at both ends of the resulting polyurethane with the residual aromatic diisocyanate.

In the polycarbonate diol represented by the formula (II), $R^1$ is an alkylene group having 2 to 10 carbon atoms.

Examples of the alkylene group include ethylene, tetramethylene, hexamethylene, octamethylene, and the like. The variable m is an integer of 2 to 100, preferably an integer of 5 to 80.

Representative examples of the polycarbonate diol include polyethylenecarbonate diol, polytetramethylenecarbonate diol, polyhexamethylenecarbonate diol, polyoctamethylenecarbonate diol, polydecamethylenecarbonate diol, and the like. These polycarbonate diols can be used alone or in admixture of at least two kinds. Among these polycarbonate diols, polyhexamethylenecarbonate diol is preferable, since it is readily available.

Representative examples of the aromatic diisocyanate include 4,4'-diphenylmethane diisocyanate, 2,6-tolylene diisocyanate, 2,4-tolylene diisocyanate, 1-methoxyphenyl-2,4-diisocyanate, 3,3'-dimethoxy-4,4'-diphenylmethane diisocyanate, 4,4'-diphenyl ether diisocyanate, 3,3'-dimethyl-4,4'-diphenyl ether diisocyanate, 2,2'-bis[4-(4-isocyanatephenoxy)phenyl]hexafluoropropane, 2,2'-bis[4-(4-isocyanatephenoxy)phenyl]propane, 2,2-dimethyl-1,3-bis(4-isocyanatephenoxy)propane, 1,5-bis(4-isocyanatephenoxy)pentane, and the like. These aromatic diisocyanates can be used alone or in admixture of at least two kinds. Among these aromatic diisocyanates, the tolylene diisocyanates are preferable, since they are readily available.

The reaction of the polycarbonate diol represented by the formula (II) with the aromatic diisocyanate can be carried out in an organic solvent.

The organic solvent includes, for instance, halogenated hydrocarbons such as tetrachloroethylene, 1,2-dichloroethane, and chloroform; ketones such as acetone, methyl ethyl ketone, methyl isobutyl ketone and cyclohexanone; cyclic ethers such as tetrahydrofuran and dioxane; aromatic hydrocarbons such as toluene and xylene; and the like. These solvents can be used alone or in admixture of at least two kinds.

It is desired that the amount of the organic solvent is adjusted so that the concentration of the aromatic diisocyanate is usually 5 to 80% by weight, preferably 20 to 70% by weight, from the viewpoints of rapidly progressing the carbodiimidation reaction and facilitating the reaction control.

The amount of the aromatic diisocyanate is not less than 2 mol per one mol of the polycarbonate diol in order that the formed polyurethane can be subsequently carbodiimidated with the residual aromatic diisocyanate, and preferably 4 to 80 mol, more preferably 5 to 50 mol in consideration of flexibility.

The reaction temperature of the polycarbonate diol with the aromatic diisocyanate is usually 0° to 120° C., preferably 20° to 100° C. Although the reaction time cannot be absolutely determined because it differs depending upon the reaction conditions, the reaction time is usually about 1 minute to about 5 hours.

The atmosphere during the reaction can be an atmosphere not containing water. The atmosphere includes, for instance, an inert gas such as nitrogen gas or argon gas, and the like.

The end point of the reaction can be a point at which hydroxyl group of the polycarbonate diol disappears. The disappearance of hydroxyl group can be confirmed by, for instance, NMR or the like.

Thus, the polycarbonate diol is reacted with the aromatic diisocyanate, thereby giving a polyurethane having isocyanate groups at both ends.

Next, the polycarbodiimide represented by the formula (I):

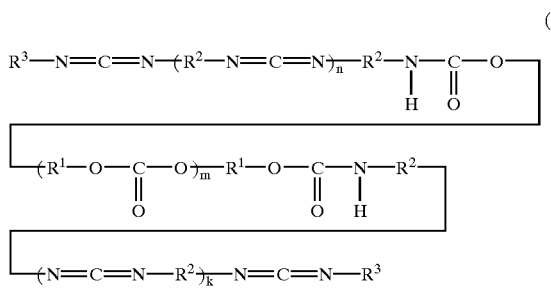

wherein $R^1$ and m are as defined above, $R^2$ is a divalent aromatic group, $R^3$ is a monovalent aromatic group, k is 0 or an integer of 1 to 30, and n is 0 or an integer of 1 to 30, is obtained by carbodiimidating isocyanate groups existing at both ends of the resulting polyurethane with the residual aromatic diisocyanate in the presence of a catalyst.

The carbodiimidation can be carried out by using the reaction solution of the polyurethane obtained above without isolating the polyurethane from the reaction solution.

The catalyst used in the carbodiimidation include known phosphorus-containing catalysts. Representative examples of the catalyst include phospholene oxides such as 1-phenyl-2-phospholen-1-oxide, 3-methyl-2-phospholen-1-oxide, 1-ethyl-2-phospholen-1-oxide, 3-methyl-1-phenyl-2-phospholen-1-oxide, and 3-phospholene isomers of these compounds. Among these catalysts, 3-methyl-1-phenyl-2-phospholen-1-oxide is preferable, because it is excellent in reactivity.

It is desired that the amount of the catalyst is 0.01 to 5% by mol, preferably 0.05 to 3% by mol, based on the aromatic diisocyanate, from the viewpoints of shortening the reaction time and avoiding abrupt boiling.

The catalyst can be usually added to the above-mentioned reaction solution.

The carbodiimidation can be carried out by heating a mixed solution prepared by adding a catalyst to the above-mentioned reaction solution to a temperature of usually 40° to 150° C., preferably 50° to 140° C.

The end point of the carbodiimidation can be confirmed by the observation of the absorbance (2140 cm$^{-1}$) ascribed to carbodiimide group and the disappearance of the absorbance (2280 cm$^{-1}$) ascribed to isocyanate group, as determined by infrared absorption spectrum (IR).

It is preferable that the end of the formed polycarbodiimide is protected in order to improve the storage stability of the polycarbodiimide solution.

As a protecting agent for protecting the end of the polycarbodiimide, an aromatic monoisocyanate can be used.

Concrete examples of the aromatic monoisocyanate include phenyl isocyanate, p-nitrophenyl isocyanate, m-tolylphenyl isocyanate, p-tolylphenyl isocyanate, p-formylphenyl isocyanate, p-isopropylphenyl isocyanate, and the like. Each of these aromatic monoisocyanates can be used alone, or in admixture of at least two kinds. Among these aromatic monoisocyanates, p-isopropylphenyl isocyanate is preferable, from the viewpoint of storage stability.

The protecting agent may be added at any time of before, beginning, middle or end of the carbodiimidation.

Alternatively, the protecting agent may be added over an entire period of the carbodiimidation.

Thus, the reaction solution of the polycarbodiimide represented by the formula (I) is obtained.

By-products contained in the reaction solution can be removed by adsorbing them with an adsorbent.

The adsorbent includes, for instance, alumina gel, silica gel, activated carbon, zeolite, activated magnesium oxide, activated bauxite, fuller's earth, activated clay, molecular sieve carbon, and the like. These adsorbents can be used alone or in admixture of at least two kinds.

When the polycarbodiimide is isolated from the reaction solution, the polycarbodiimide can be precipitated by adding a poor solvent to the reaction solution.

The poor solvent includes, for instance, methanol, ethanol, isopropyl alcohol, hexane, and the like.

The precipitated polycarbodiimide can be collected by filtration or the like, and washed with the above-mentioned poor solvent to remove unreacted monomers and the catalyst. The polycarbodiimide can be dried after washing as occasion demands.

In the polycarbodiimide represented by the formula (I), $R^1$ is an alkylene group having 2 to 10 carbon atoms. Among $R^1$, an alkylene group having 3 to 8 carbon atoms is preferable, and hexamethylene group is more preferable.

$R^2$ is a divalent aromatic group. Concrete examples of $R^2$ include a group represented by the formula (III):

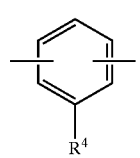

wherein $R^4$ is an alkyl group having 1 to 4 carbon atoms or an alkoxy group having 1 to 4 carbon atoms, a group represented by the formula (IV):

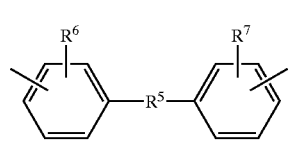

wherein $R^5$ is an alkylene group having 1 to 4 carbon atoms or oxygen atom, and each of $R^6$ and $R^7$ is independently hydrogen atom, an alkyl group having 1 to 4 carbon atoms or an alkoxy group having 1 to 4 carbon atoms, a group represented by the formula (V):

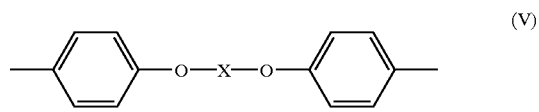

wherein X is a group represented by the formula (VI):

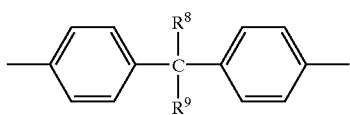
(VI)

wherein each of $R^8$ and $R^9$ is independently an alkyl group having 1 to 4 carbon atoms which may have a halogen atom, or a linear or branched alkylene group having 3 to 6 carbon atoms.

In the group represented by the formula (III), $R^4$ is an alkyl group having 1 to 4 carbon atoms or an alkoxy group having 1 to 4 carbon atoms. Among $R^4$, methyl group and methoxy group are preferable.

In the group represented by the formula (IV), $R^5$ is an alkylene group having 1 to 4 carbon atoms or oxygen atom. Among $R^5$, methylene group and oxygen atom are preferable. In addition, each of $R^6$ and $R^7$ is independently hydrogen atom, an alkyl group having 1 to 4 carbon atoms or an alkoxy group having 1 to 4 carbon atoms. Among $R^6$ and $R^7$, hydrogen atom, methyl group and methoxy group are preferable.

In the group represented by the formula (V), X is a group represented by the formula (VI), or a linear or branched alkylene group having 3 to 6 carbon atoms. In the group represented by the formula (VI), each of $R^8$ and $R^9$ is independently an alkyl group having 1 to 4 carbon atoms which may have a halogen atom. The halogen atom includes fluorine atom, chlorine atom, bromine atom and iodine atom. Among them, fluorine atom is preferable. Among the alkyl groups having 1 to 4 carbon atoms which may have a halogen atom, methyl group and trifluoromethyl group are preferable. As the linear or branched alkylene group having 3 to 6 carbon atoms, hexamethylene group and 2,2-dimethylpropylene group are preferable.

Concrete examples of $R^2$ include those represented by the formulae:

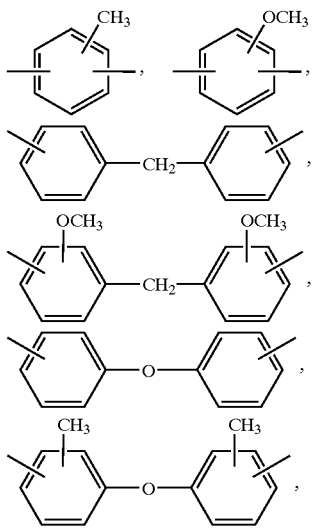

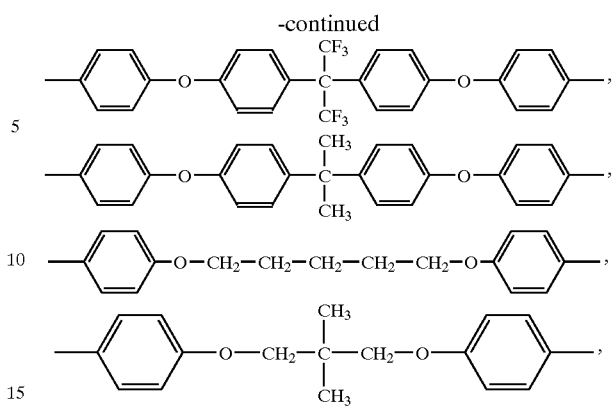

and the like. Among these groups, a group represented by the formula:

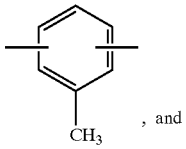
, and a group represented by the formula:

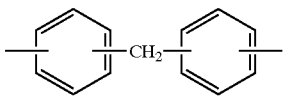

are preferable.

When the aromatic diisocyanate is used as a raw material for the polycarbodiimide represented by the formula (I), $R^2$ is an aromatic diisocyanate moiety such as tolylene diisocyanate residue or diphenylmethane diisocyanate residue.

$R^3$ is a monovalent aromatic group. Representative examples of $R^3$ include a group represented by the formula (VII):

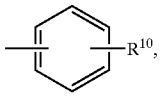
(VII)

wherein $R^{10}$ is an alkyl group having 1 to 6 carbon atoms. $R^{10}$ is an alkyl group having 1 to 6 carbon atoms, preferably an alkyl group having 1 to 4 carbon atoms, more preferably propyl group. Among $R^3$, the group represented by the formula:

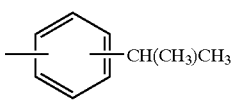

is preferable. More specifically, $R^3$ is preferably an isopropylphenyl group such as p-isopropylphenyl group.

When the aromatic monoisocyanate is used as a protecting agent during the preparation of the polycarbodiimide represented by the formula (I), $R^3$ is an aromatic monoisocyanate residue such as p-isopropylphenyl isocyanate residue.

The variable k is 0 or an integer of 1 to 30, preferably an integer of 2 to 20. The variable m is an integer of 2 to 100, preferably an integer of 5 to 80. The variable n is 0 or an integer of 1 to 30, preferably an integer of 2 to 20.

It is desired that the average degree of polymerization of the polycarbodiimide represented by the formula (I) [sum of k, m and n in the formula (I)] is 2 to 160, preferably 9 to 120, from the viewpoint of increasing film strength formed by using the polycarbodiimide and the viewpoint of avoiding to readily gelate at ambient temperature in a short period of time.

The polycarbodiimide of the present invention can also be used as a solution prepared by dissolving the polycarbodiimide in an organic solvent. In this case, as the organic solvent, there can be used an organic solvent used for the reaction of the polycarbonate diol with the aromatic diisocyanate. Before the preparation of the polycarbodiimide solution, it is preferable that the polycarbodiimide is previously washed, from the viewpoint of improving stability of the polycarbodiimide solution.

The polycarbodiimide can be suitably used for various applications or uses. The polycarbodiimide can be used as a bonding agent for electronic parts by utilizing its heat resistance. Also, the polycarbodiimide can be suitably used for, for instance, a film, an adhesive film for die bonding, a semiconductor device comprising a semiconductor chip and an electrode, wherein the semiconductor chip is bonded to the electrode with the adhesive film for die bonding; an adhesive film for underfilling; a semiconductor device comprising a semiconductor element and a wiring circuit substrate, wherein a gap between the semiconductor element and the wiring circuit substrate is sealed with the adhesive film for underfilling; and the like.

The process for producing a film made of the polycarbodiimide includes a process for forming a polycarbodiimide solution into a film having an appropriate thickness by a known method such as casting method, spin coating method, roll coating method, or the like; and thereafter heating the formed film to remove a solvent from the solution; and the like.

As the polycarbodiimide solution, there can be used the above-mentioned reaction solution of the polycarbodiimide.

It is desired that the drying temperature is 20° to 350° C., preferably 50° to 250° C., more preferably 70° to 200° C., from the viewpoint of sufficiently removing the solvent from the film and the viewpoint of suppressing thermosetting of the film.

It is desired that the thickness of the film is properly adjusted depending upon its applications or uses. It is desired that the thickness of the film is usually 0.3 $\mu$m to 1.5 mm, preferably 0.5 $\mu$m to 1 mm, more preferably 1 to 200 $\mu$m. In addition, the surface shape and size of the film can be also properly adjusted depending upon the applications or uses of the film, such as lead frames and semiconductor chips.

During the production of the film, there can be added to the polycarbodiimide various additives such as inorganic fillers, lubricants for obtaining surface smoothness, leveling agents, defoaming agents, silane coupling agents for improving adhesiveness, titanium-based coupling agents, and nonionic surfactants, fluorine-containing surfactants, silicone-based adhesive aids as occasion demands within a range so as not to impair workability, heat resistance and the like. The amount of the additive cannot be absolutely determined because the amount differs depending upon its kinds. It is desired that the amount of the additive is usually 0.1 to 100 parts by weight, preferably 0.2 to 50 parts by weight, based on 100 parts by weight of the polycarbodiimide.

The above-mentioned film can be used as an adhesive film. In this case, in order to impart electric conductivity, improve heat conductivity, and control elastic modulus, there can be contained in the film powder of an inorganic material, such as metal such as aluminum, copper, silver, gold, nickel, chromium, lead, tin, zinc or palladium, an alloy such as solder, ceramic such as alumina, silica, magnesia or silicon nitride, or carbon as occasion demands. The amount of the powder cannot be absolutely determined because the amount differs depending upon its kinds. It is desired that the amount of the powder is usually 0.1 to 100 parts by weight preferably 0.2 to 50 parts by weight, based on 100 parts by weight of the polycarbodiimide.

The thickness of the adhesive film cannot be absolutely determined because it differs depending upon its applications or uses. It is desired that the thickness of the adhesive film is usually 0.3 $\mu$m to 1.5 mm, preferably 0.5 $\mu$m to 1 mm, more preferably 1 to 200 $\mu$m.

In addition, the adhesive film can be used by integrating it with a support. The support includes, for instance, metal foils, insulating films, and the like. The metal foil includes thin metal film made of aluminum, copper, silver, gold, nickel, indium, chromium, lead, tin, zinc, palladium, or an alloy thereof. The insulating film includes a film having heat resistance or chemical resistance made of polyamide, polyimide, polyester or the like. Each of the metal foil and the insulating film can be used alone, or they can be used in the form of a laminate comprising at least two layers of the metal foil and the insulating film, for instance, a laminate comprising two layers such as a metal foil/insulating film laminate. Representative examples of the metal foil/ insulating film laminate include, for instance, copper foil/ polyimide film laminate, and the like.

The adhesive film can be formed by coating a polycarbodiimide solution on a support to give a laminate of an adhesive film and the support. Alternatively, a previously formed adhesive film can be laminated to a support by means of pressing or the like.

The adhesive film is cured by heating, thereby giving a cured product showing strong adhesive strength and low elastic modulus. Heating can be performed by a means such as a heater or ultrasonication. It is desired that the heating temperature is usually 50° to 300° C., preferably 100 to 250° C. The heating time cannot be absolutely determined depending upon its heating temperature, and is usually 1 second to 30 minutes, preferably 1 second to 3 minutes.

The adhesive film of the present invention has low elastic modulus, and is excellent in flexibility, easily handled, and also excellent in adhesiveness to a semiconductor element and storage stability. Therefore, the adhesive film can be suitably used for adhesion or bonding of various materials, for instance, electric and electronic parts represented by semiconductor chips and lead frames.

In addition, the film of the present invention can be used as an adhesive film for die bonding.

The adhesive film for die bonding can be obtained by forming the film into a strip, and winding the resulting ribbon with a reel or the like. The thickness of the adhesive film for die bonding cannot be absolutely determined because it differs depending upon its applications or uses. It is desired that the thickness of the adhesive film is usually 0.3 µm to 1.5 mm, preferably 0.5 µm to 1 mm, more preferably 1 to 200 µm. In addition, the width of the ribbon can be properly adjusted depending upon its applications or uses.

The adhesive film for die bonding can be used by cutting the adhesive film into given dimensions such as length and shape by an appropriate means such as a cutter.

The adhesive film for die bonding can be suitably used for bonding the semiconductor chip to the electrode in the semiconductor device.

The semiconductor chip can be firmly bonded to the electrode by, for instance, tentatively bonding an adhesive film for die bonding having a desired size to an electrode, for instance, a die pad of a lead frame, mounting a semiconductor chip thereon, and heating the semiconductor chip.

Heating can be performed by a means such as a heater or ultrasonication. It is desired that the heating temperature is usually 50° to 300° C., preferably 100 to 250° C. The heating time cannot be absolutely determined depending upon its heating temperature, and is usually 1 second to 30 minutes, preferably 1 second to 3 minutes.

Thus, since the adhesive film for die bonding is cured by heating, the semiconductor chip is firmly bonded to the electrode.

In addition, according to the present invention, the adhesive film for die bonding is fixed on a dicing apparatus, and one side of a silicone wafer is tentatively bonded to the adhesive film for die bonding at a temperature of room temperature to 90° C. and fixed. Thereafter, the silicon wafer to which the adhesive film is tentatively bonded is cut with the dicing apparatus, so that the semiconductor chip in which the adhesive film for die bonding is retained can be obtained. The adhesive film for die bonding of the resulting semiconductor chip is mounted on an electrode, such as a die pad of a lead frame, and heated, so that the semiconductor chip can be firmly bonded to the electrode. Heating can be carried out by using the same means as mentioned above under the same conditions as mentioned above.

In addition, the film of the present invention can be used as an adhesive film for underfilling. The adhesive film for underfilling can be favorably used for sealing a gap formed between a semiconductor element and a wiring circuit substrate.

The thickness of the adhesive film for underfilling is not limited to specified ones. It is desired that the thickness of the adhesive film for underfilling is 0.3 µm to 1.5 mm, preferably 0.5 µm to 1 mm, more preferably 1 to 200 µm, from the viewpoints of filling the gap between the semiconductor element and the wiring circuit substrate and avoiding hindrance of electric connection between the connecting electrodes.

The size of the adhesive film for underfilling can be properly adjusted in accordance with the size (area) of the semiconductor element mounted. It is preferable that the size of the adhesive film for underfilling is usually about the same size (area) as a semiconductor element.

The gap between the semiconductor element and the wiring circuit substrate can be sealed by, for instance, filling the gap between the semiconductor element and the wiring circuit substrate with an adhesive film for underfilling, and thereafter heating to cure the adhesive film for underfilling. It is desired that the heating temperature is 100° to 225° C., preferably 120° to 200° C. The heating time cannot be absolutely determined depending upon its heating temperature. It is desired that the heating time is usually 3 to 300 minutes, preferably 5 to 180 minutes.

When the gap between the semiconductor element and the wiring circuit substrate is filled with the adhesive film for underfilling, it is preferable that the semiconductor element is usually pressed. The pressure for pressing the semiconductor element can be properly adjusted in accordance with the materials and the number of the connecting electrodes, temperature, and the like. Usually, the pressure per electrode is preferably 0.098 to 4.9 N, more preferably 0.196 to 2.94 N.

Next, a semiconductor device in which a gap formed between a semiconductor element and a wiring circuit substrate is sealed with the adhesive film for underfilling of the present invention will be explained.

FIG. 1 is a schematic explanatory view showing one embodiment of the semiconductor device of the present invention. In FIG. 1, plural connecting electrodes 2 are mounted on one side of a wiring circuit substrate 1. Connecting electrodes 3 corresponding to the connecting electrodes 2 are provided on the surface of a semiconductor element 5. The connecting electrodes 2 are electrically connected with the connecting electrodes 3 by contacting them with each other. A sealing resin layer 4 made of an adhesive film for underfilling is provided between the wiring circuit substrate 1 and the semiconductor element 5. The semiconductor device takes a face-down structure.

Figure 2:
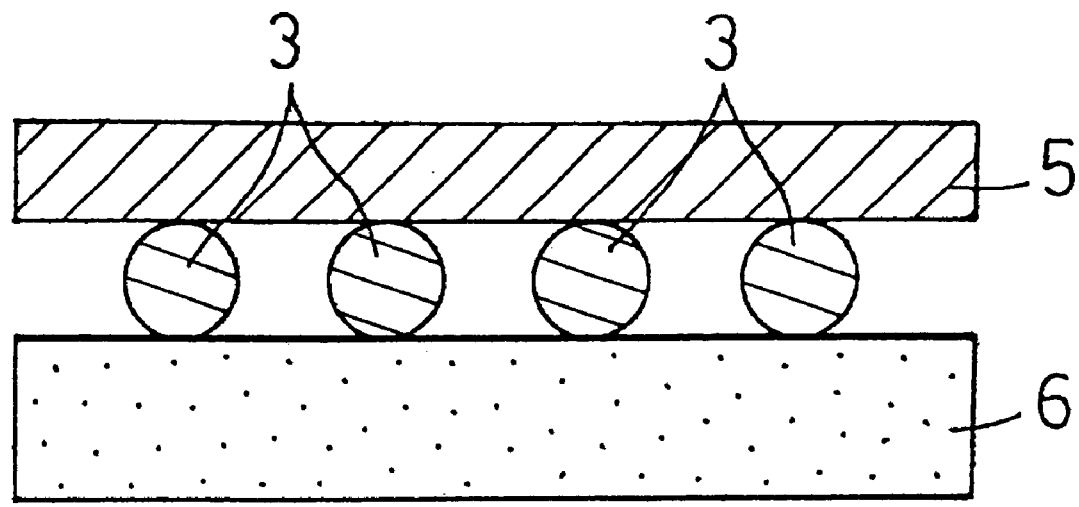
FIG. 2 is a schematic view showing one embodiment of the process for producing the semiconductor device shown in FIG. 1.
Figure 3:
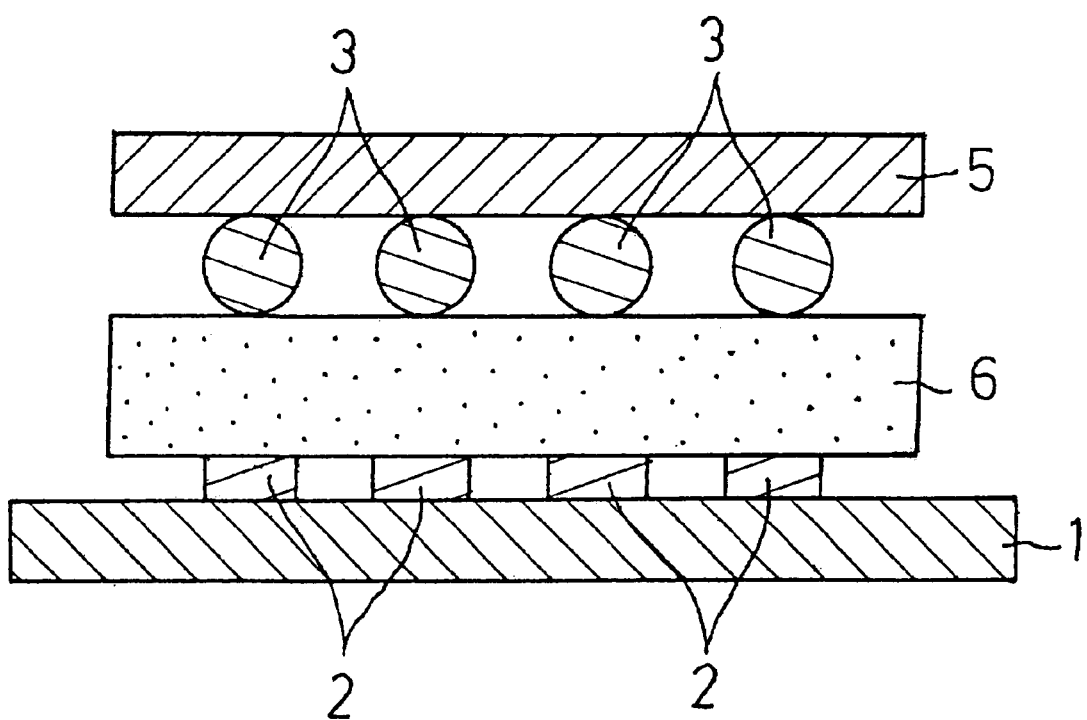
FIG. 3 is a schematic view showing another embodiment of the process for producing the semiconductor device shown in FIG. 1.

The semiconductor device shown in FIG. 1 can be produced by procedures, for instance, shown in FIGS. 2 and 3.

FIG. 2 is a schematic explanatory view showing a laminate comprising a semiconductor element 5 and an adhesive film 6 for underfilling, wherein the semiconductor element 5 is laminated with the adhesive film 6 for underfilling through connecting electrodes 3.

The face of the adhesive film 6 for underfilling of the laminate shown in FIG. 2 is mounted on the connecting electrodes 2 of a wiring circuit substrate 1 as shown in FIG. 3.

Next, the semiconductor element is heated and pressed at a desired temperature and under a desired pressure, so that the adhesive film 6 for underfilling is thermally melted and extruded into the gap between the connecting electrodes 2, 3, and the connecting electrodes 2 are contacted with the connecting electrodes 3, and thereby the connecting electrodes 2 are electrically connected with the connecting electrodes 3, and at the same time the melted adhesive film 6 for underfilling is cured. Thus, as shown in FIG. 1, a sealing resin layer 4 made of an adhesive film for underfilling is formed between the wiring circuit substrate 1 and the semiconductor element 5, so that the wiring circuit substrate 1 and the semiconductor element 5 are electrically connected, and at the same time they are firmly bonded with each other.

Figure 4:
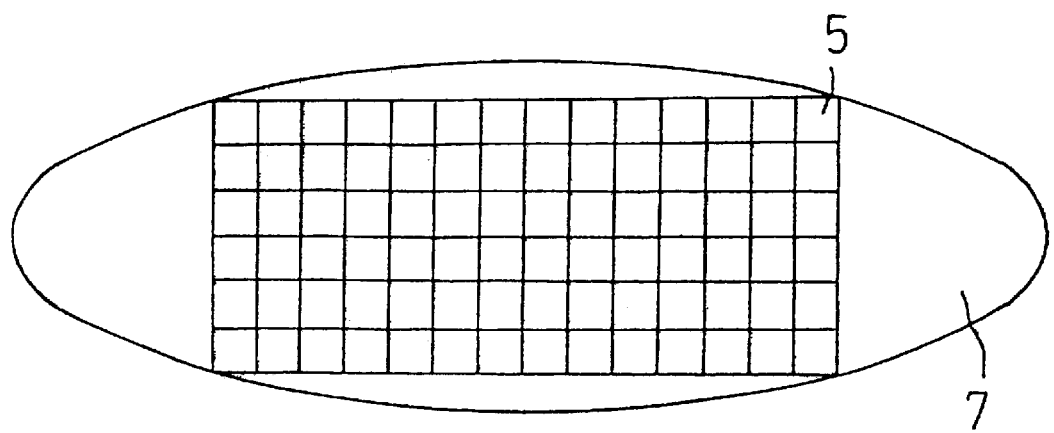
FIG. 4 is a schematic view showing plural semiconductor elements formed on a semiconductor wafer.

The pasting of the adhesive film 6 for underfilling to the semiconductor element 5 can be carried out before or after cutting out the semiconductor element 5 from a semiconductor wafer 7 as shown in FIG. 4.

Figure 5:
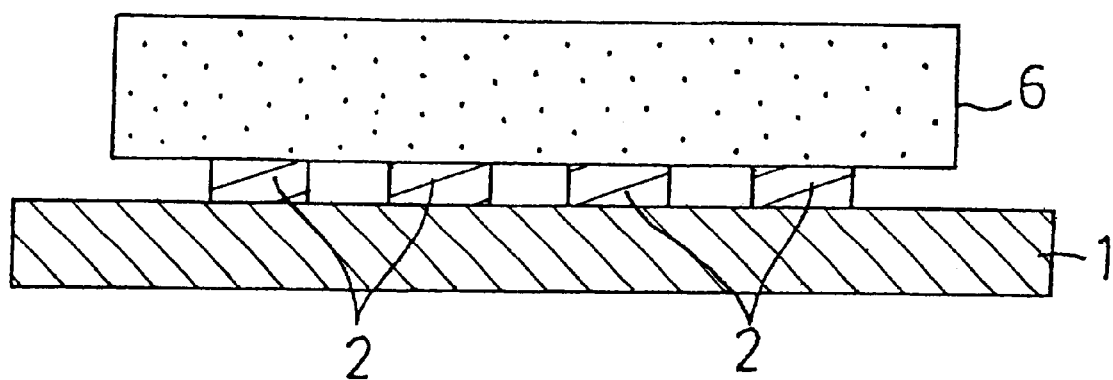
FIG. 5 is a schematic view showing a still another embodiment of the process for producing the semiconductor device shown in FIG. 1.

Another process for producing a semiconductor device comprising a semiconductor element and a wiring circuit substrate, in which a gap formed between the semiconductor element and the wiring circuit substrate is sealed with an adhesive film for underfilling is as follows:

As shown in FIG. 5, using a wiring circuit substrate 1 on which plural connecting electrodes 2 are provided, an adhesive film 6 for underfilling is mounted on the connecting electrodes 2. Next, a semiconductor element provided with connecting electrodes (not illustrated in the figure) is placed on the wiring circuit substrate 1. Thereafter, the semiconductor element is heated and pressed to thermally melt the adhesive film 6 for underfilling and extrude the melted adhesive film 6 into the gap between the connecting electrodes 2 and the connecting electrodes (not illustrated in the figure), and thereby the connecting electrodes 2 are electrically connected with the connecting electrodes (not illustrated in the Figure). At the same time, the melted adhesive film 6 for underfilling is cured to form a sealing resin layer (not illustrated in the figure), and thereby electrical connection and firm bonding between the wiring circuit substrate 1 and the semiconductor element (not illustrated in the figure) are performed.

According to the process, the semiconductor device shown in FIG. 1 can be obtained.

The above-mentioned process for producing the semiconductor device is explained in a case where the semiconductor element is mounted on the wiring circuit substrate. However, the present invention is not limited only to the aforementioned process, and the wiring circuit substrate can be mounted on the semiconductor element.

EXAMPLES

Next, the present invention will be more specifically described by means of the following examples. All of the preparations were carried out under nitrogen gas stream. Physical properties of the resulting polycarbodiimide were determined in accordance with the following methods.

1. Infrared Absorption (IR) Spectrum

The infrared absorption spectrum was determined by using an IR spectrometer commercially available from JEOL (Nippon Denshi Kabushiki Kaisha) under the product number of FT/IR-230.

2. Initiation Temperature for Thermal Decomposition

The initiation temperature for thermal decomposition was determined by using an analyzer commercially available from Seiko Instruments Inc. under the product number of TG/DTA300. The temperature at which 5% by weight of a polymer was reduced was defined as temperature for 5% by weight reduction (Td).

3. Number-Average Molecular Weight

The number-average molecular weight was determined by using an apparatus commercially available from Tosoh Corporation under the product number of HLC 8120 with a column commercially available from Tosoh Corporation under the product numbers of $GMH_{HR-H}+GMH_{HR-H}+G2000H_{HR}$ and tetrahydrofuran as a developing solvent.

4. Elastic Modulus (E')

The elastic modulus was determined by using an apparatus for dynamic elastic modulus commercially available from Seiko Instruments Inc. under the product number of DMS210.

5. Glass Transition Temperature (Tg)

The glass transition temperature was determined by using an apparatus for dynamic elastic modulus commercially available from Seiko Instruments Inc. under the product number of DMS210.

6. Adhesive Strength

A 180° peel strength was determined by using an autograph commercially available from Shimadzu Corporation under the product number of AGS-100D.

Example 1

Preparation of Polycarbodiimide

A 500 mL four-necked flask equipped with a stirrer, a dropping funnel, a reflux condenser and a thermometer was charged with 100 g (0.57 mol) of tolylene diisocyanate commercially available from Takeda Chemical Industries, Ltd. under the trade name of Takenate 80, 100 g (0.10 mol) of a polyhexamethylene carbonatediol commercially available from Ube Industries, Ltd. under the product name of UH-CARB 100, 75 g of xylene and 25 g of cyclohexanone, and the urethanation was carried out at 100° C. for 3 hours.

After the solution was cooled to room temperature, the flask was charged with 0.883 g (4.59 mmol) of a carbodiimidation catalyst (3-methyl-1-phenyl-2-phospholen-1-oxide) and 6.4793 g (40.2 mmol) of p-isopropylphenyl isocyanate, and the mixture was stirred at 100° C. for 2 hours to carry out carbodiimidation, to give a reaction solution of polycarbodiimide. The solvents were removed from the reaction solution, to give a polycarbodiimide.

Figure 6:
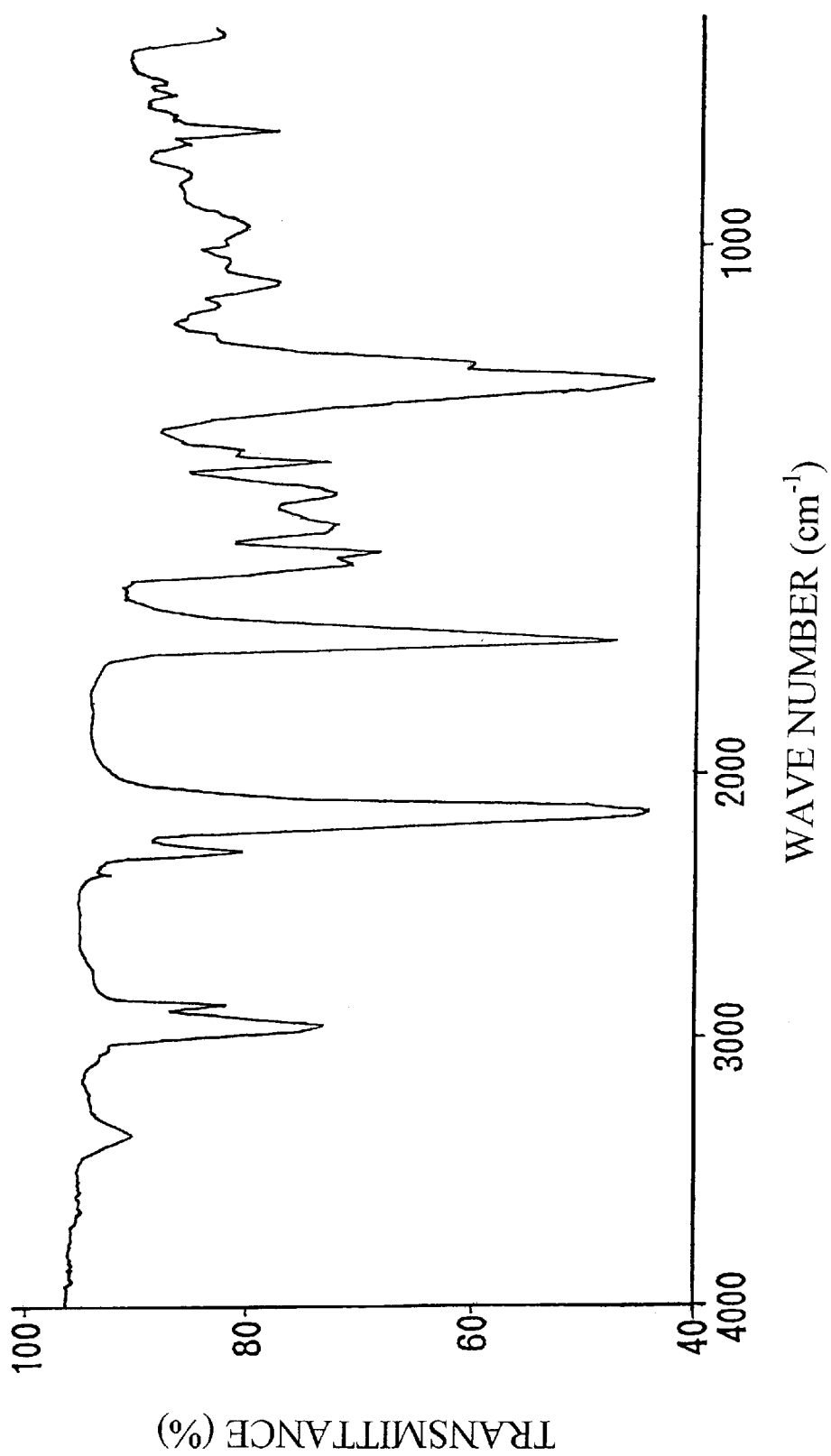
FIG. 6 is an IR spectrum of a polycarbodiimide obtained in Example 1.

The IR spectrum of the resulting polycarbodiimide is shown in FIG. 6. As shown in FIG. 6, the carbodiimidation was confirmed on the bases of the observation of the absorption ascribed to carbodiimide group (2140 cm$^{-1}$) and the disappearance of the absorption ascribed to isocyanate group (2280 cm$^{-1}$).

The number-average molecular weight of the resulting polycarbodiimide was 6300.

In addition, in the polycarbodiimide represented by the formula (I), m was 7, n was 15 and k was 15, wherein m was calculated on the basis of the identification of end hydroxyl group of the polyhexamethylene carbonate diol, and n and k were calculated on the basis of the number-average molecular weight of the resulting polycarbodiimide. In addition, $R^1$ was hexamethylene group, $R^2$ was composed of 20% by mol of a group represented by the formula:

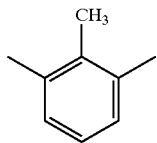

and 80% by mol of a group represented by the formula:

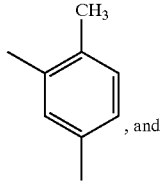, and $R^3$ was a group represented by the formula:

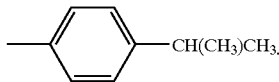

Example 2

Preparation of Polycarbodiimide

A 500 mL four-necked flask equipped with a stirrer, a dropping funnel, a reflux condenser and a thermometer was charged with 100 g (0.57 mol) of tolylene diisocyanate commercially available from Takeda Chemical Industries, Ltd. under the trade name of Takenate 80, 100 g (0.05 mol) of a polyhexamethylene carbonatediol commercially available from Ube Industries, Ltd. under the product name of UH-CARB 200, 75 g of xylene and 25 g of cyclohexanone, and the urethanation was carried out at 100° C. for 3 hours.

After the solution was cooled to room temperature, the flask was charged with 0.883 g (4.59 mmol) of a carbodiimidation catalyst (3-methyl-1-phenyl-2-phospholen-1-oxide) and 6.4793 g (40.2 mmol) of p-isopropylphenyl isocyanate, and the mixture was stirred at 100° C. for 1 hour to carry out carbodiimidation, to give a reaction solution of polycarbodiimide. The solvents were removed from the reaction solution, to give a polycarbodiimide.

Figure 7:
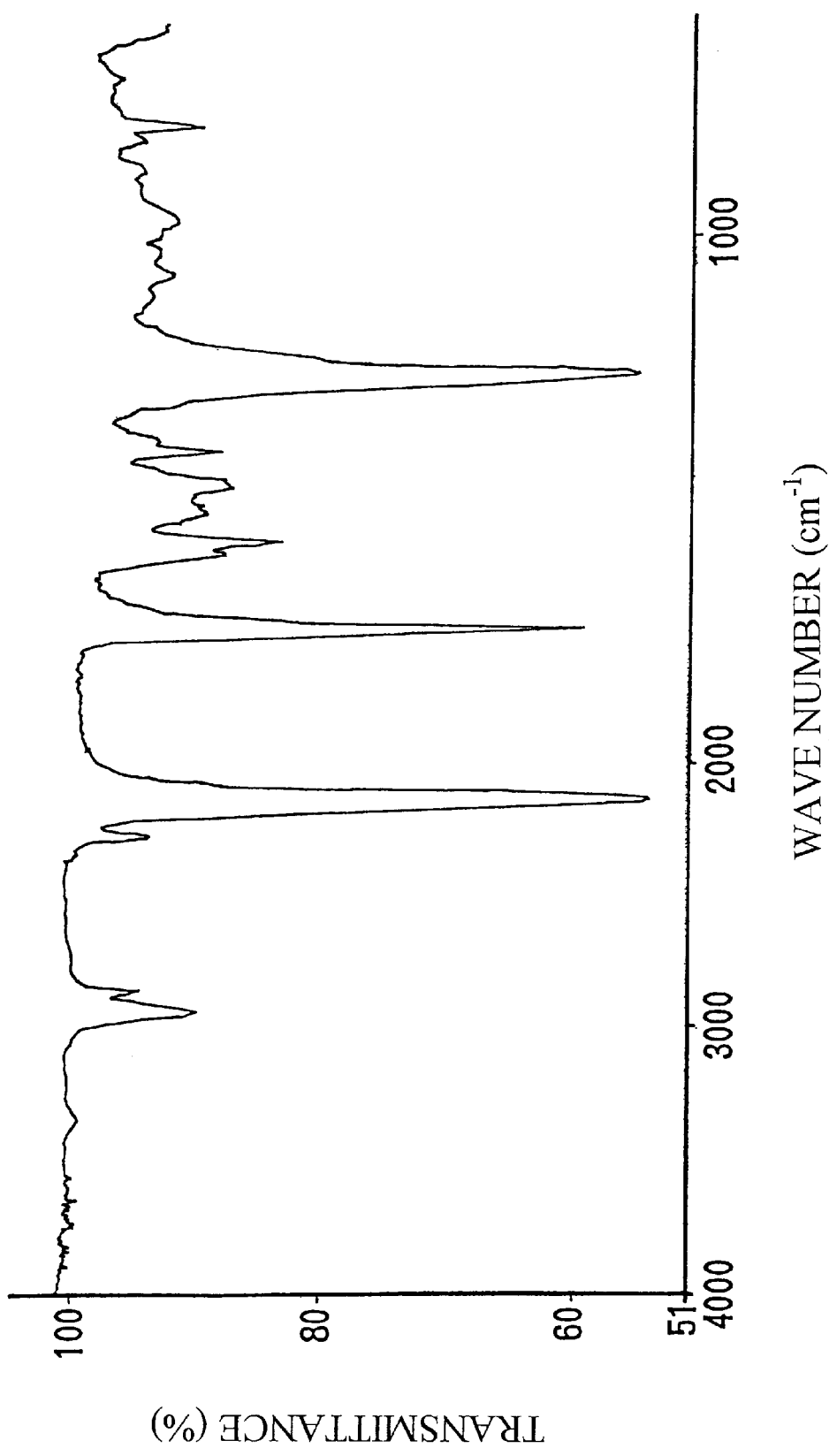
FIG. 7 is an IR spectrum of a polycarbodiimide obtained in Example 2.

The IR spectrum of the resulting polycarbodiimide is shown in FIG. 7. As shown in FIG. 7, the carbodiimidation was confirmed on the bases of the observation of the absorption ascribed to carbodiimide group (2140 cm$^{-1}$) and the disappearance of the absorption ascribed to isocyanate group (2280 cm$^{-1}$).

The number-average molecular weight of the resulting polycarbodiimide was 6000.

In addition, in the polycarbodiimide represented by the formula (I), m was 14, n was 11 and k was 11, wherein m was calculated on the basis of the identification of end hydroxyl group of the polyhexamethylene carbonatediol, and n and k were calculated on the basis of the number-average molecular weight of the resulting polycarbodiimide. In addition, $R^1$ was hexamethylene group, $R^2$ was composed of 20% by mol of a group represented by the formula:

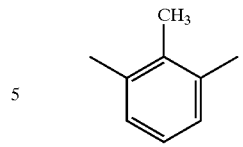

and 80% by mol of a group represented by the formula:

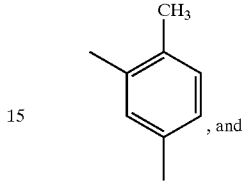, and $R^3$ was a group represented by the formula:

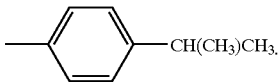

Example 3

Preparation of Polycarbodiimide

A 500 mL four-necked flask equipped with a stirrer, a dropping funnel, a reflux condenser and a thermometer was charged with 100 g (0.57 mol) of tolylene diisocyanate commercially available from Takeda Chemical Industries, Ltd. under the trade name of Takenate 80, 100 g (0.034 mol) of a polyhexamethylene carbonatediol commercially available from Ube Industries, Ltd. under the product name of UH-CARB 300, 112.5 g of xylene and 37.5 g of cyclohexanone, and the urethanation was carried out at 100° C. for 3 hours.

After the solution was cooled to room temperature, the flask was charged with 0.883 g (4.59 mmol) of a carbodiimidation catalyst (3-methyl-1-phenyl-2-phospholen-1-oxide) and 6.4793 g (40.2 mmol) of p-isopropylphenyl isocyanate, and the mixture was stirred at 100° C. for 1 hour to carry out carbodiimidation, to give a reaction solution of polycarbodiimide. The solvents were removed from the reaction solution, to give a polycarbodiimide.

Figure 8:
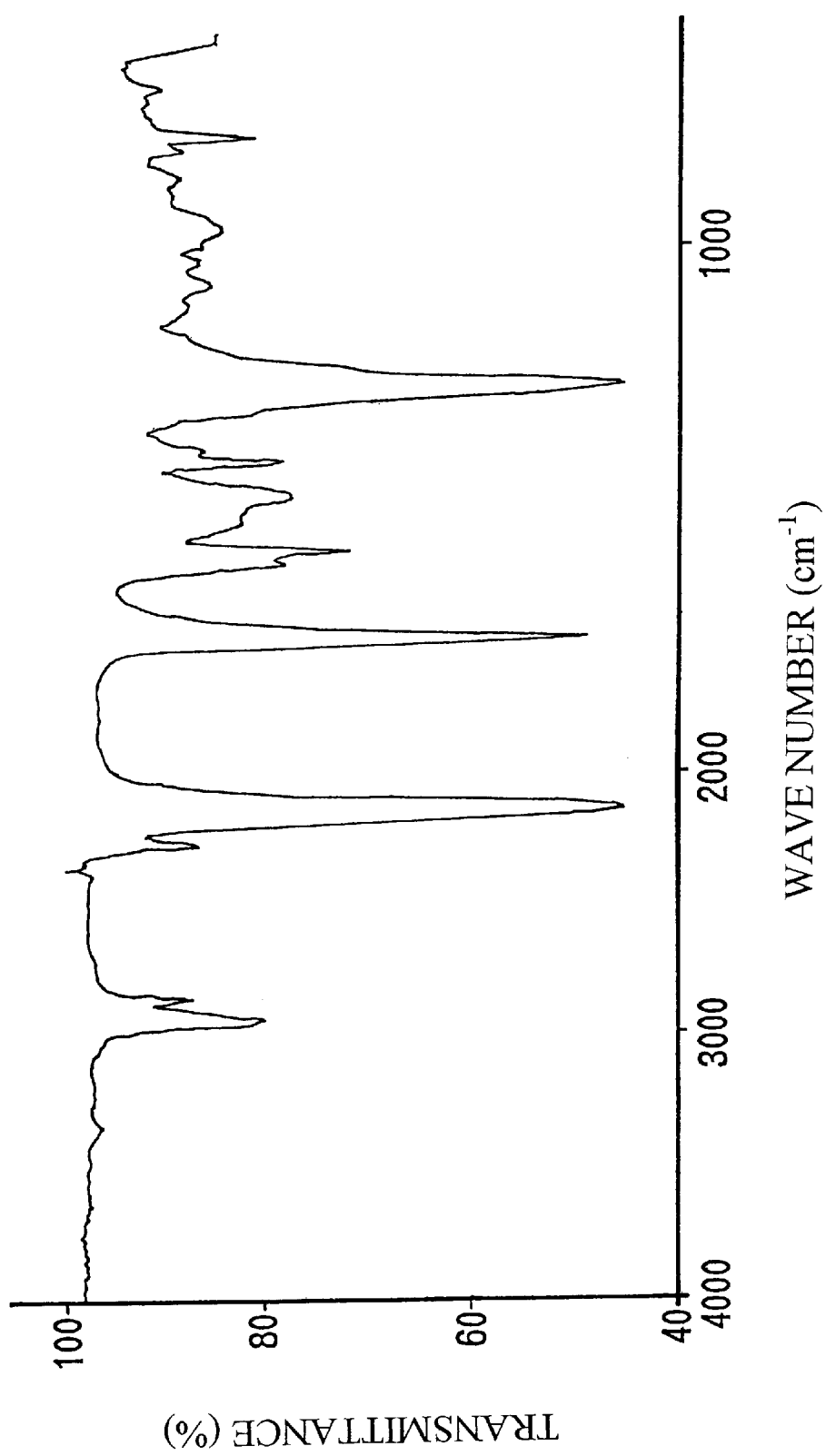
FIG. 8 is an IR spectrum of a polycarbodiimide obtained in Example 3.

The IR spectrum of the resulting polycarbodiimide is shown in FIG. 8. As shown in FIG. 8, the carbodiimidation was confirmed on the bases of the observation of the absorption ascribed to carbodiimide group (2140 cm$^{-1}$) and the disappearance of the absorption ascribed to isocyanate group (2280 cm$^{-1}$).

The number-average molecular weight of the resulting polycarbodiimide was 5400.

In addition, in the polycarbodiimide represented by the formula (I), m was 21, n was 7 and k was 7, wherein m was calculated on the basis of the identification of end hydroxyl group of the polyhexamethylene carbonatediol, and n and k were calculated on the basis of the number-average molecular weight of the resulting polycarbodiimide. In addition, $R^1$ was hexamethylene group, $R^2$ was composed of 20% by mol of a group represented by the formula:

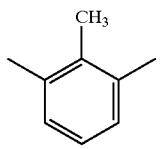

and 80% by mol of a group represented by the formula:

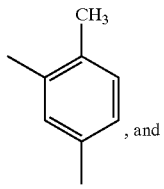

$R^3$ was a group represented by the formula:

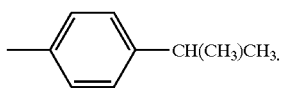

Example 4

Production of Adhesive Film

The reaction solution of polycarbodiimide obtained in Example 1 was coated on a copper foil having a thickness of 105 μm, and the coating was heated at 90° C. for 30 minutes, and then at 200° C. for 30 minutes, to give an adhesive film having an adhesive layer of 50 μm in thickness, made of the polycarbodiimide.

The thermal properties of the resulting adhesive film were evaluated. As a result, the glass transition temperature (Tg) was 133° C., and the elastic modulus was 940 MPa at 35° C. Also, the temperature for 5% by weight reduction (Td) was 380° C.

The adhesive film was pasted on a 42 alloy plate (the alloy being made of 42% by weight nickel and 58% by weight iron), and the adhesive film was bonded to the 42 alloy plate by pressing under the pressure of 5 MPa at 200° C. for 1 second. The adhesive strength was determined. As a result, the adhesive film exhibited an adhesive strength of 1500 g/cm. The adhesive film was heated at 200° C. with a hot air dryer for one week, and thereafter the adhesive strength was determined. As a result, the adhesive film exhibited an adhesive strength of 1420 g/cm.

In addition, only the adhesive film was heated at 200° C. with a hot air dryer for one week, and thereafter the adhesive film was placed on a flat stand. Whether or not there were any cracks generated in the film was examined after the adhesive film was bended at 180° with a pressure of 1 MPa. The flexibility was evaluated in accordance with the following criteria. The results are shown in Table 1.
[Criteria for Flexibility]
   o: no cracks being generated in the film
   X: cracks being generated in the film
Next, the elastic modulus of the film at 35° C. was determined. The elastic modulus was 1100 MPa.

Example 5

Production of Adhesive Film

The reaction solution of polycarbodiimide obtained in Example 2 was coated on a copper foil having a thickness of 105 μm, and the coating was heated at 90° C. for 30 minutes, and then at 200° C. for 30 minutes, and dried, to give an adhesive film having an adhesive layer of 50 μm in thickness, made of the polycarbodiimide.

The thermal properties of the resulting adhesive film were evaluated. As a result, the glass transition temperature (Tg) was 129° C., and the elastic modulus was 42 MPa at 35° C. In addition, the temperature for 5% by weight reduction (Td) was 390° C.

The adhesive film was pasted on a 42 alloy plate, and the adhesive film was bonded to the 42 alloy plate by pressing under a pressure of 5 MPa at 200° C. for 1 second. The adhesive strength was determined. As a result, the adhesive film exhibited an adhesive strength of 1550 g/cm. The adhesive film was heated at 200° C. with a hot air dryer for one week, and thereafter the adhesive strength was determined. As a result, the adhesive film exhibited an adhesive strength of 1490 g/cm.

In addition, only the adhesive film was heated at 200° C. with a hot air dryer for one week, and thereafter the flexibility was evaluated in the same manner as in Example 4. The results are shown in Table 1.

Next, the elastic modulus of the film at 35° C. was determined. The elastic modulus was 53 MPa.

Example 6

Production of Adhesive Film

The reaction solution of polycarbodiimide obtained in Example 3 was coated on a copper foil having a thickness of 105 μm, and the coating was heated at 90° C. for 30 minutes, and then at 200° C. for 30 minutes, and dried, to give an adhesive film having an adhesive layer of 50 μm in thickness, made of the polycarbodiimide.

The thermal properties of the resulting adhesive film were evaluated. As a result, the glass transition temperature (Tg) was 120° C., and the elastic modulus was 17 MPa at 35° C. In addition, the temperature for 5% by weight reduction (Td) was 395° C.

The adhesive film was pasted on a 42 alloy plate, and the adhesive film was bonded to the 42 alloy plate by pressing under a pressure of 5 MPa at 200° C. for 1 second. The adhesive strength was determined. As a result, the adhesive film exhibited an adhesive strength of 1390 g/cm. The adhesive film was heated at 200° C. with a hot air dryer for one week, and thereafter the adhesive strength was determined. As a result, the adhesive film exhibited an adhesive strength of 1350 g/cm.

In addition, only the adhesive film was heated at 200° C. with a hot air dryer for one week, and thereafter the flexibility was evaluated in the same manner as in Example 4. The results are shown in Table 1.

Next, the elastic modulus of the film at 35° C. was determined. The elastic modulus was 25 MPa.

Comparative Example 1

A 500 mL four-necked flask equipped with a stirrer, a dropping funnel, a reflux condenser and a thermometer was charged with 100 g (0.57 mol) of tolylene diisocyanate commercially available from Takeda Chemical Industries, Ltd. under the trade name of Takenate 80, 75 g of xylene and 25 g of cyclohexanone.

The flask was charged with 0.883 g (4.59 mmol) of a carbodiimidation catalyst (3-methyl-1-phenyl-2-phospholen-1-oxide) and 6.4793 g (40.2 mmol) of p-isopropylphenyl isocyanate, and the mixture was stirred at 100° C. for 1 hour to carry out carbodiimidation, to give a reaction solution of polycarbodiimide. The solvents were removed from the reaction solution, to give a polycarbodiimide.

The IR spectrum of the resulting polycarbodiimide was determined. As a result, the carbodiimidation was confirmed on the bases of the observation of the absorption ascribed to carbodiimide group (2140 cm$^{-1}$) and the disappearance of the absorption ascribed to isocyanate group (2280 cm$^{-1}$).

The number-average molecular weight of the resulting polycarbodiimide was 4800.

The resulting reaction solution of polycarbodiimide was coated on a copper foil having a thickness of 105 μm, and the coating was heated at 90° C. for 30 minutes, and then at 200° C. for 30 minutes, and dried, to give an adhesive film having an adhesive layer of 50 μm in thickness, made of the polycarbodiimide.

The thermal properties of the resulting adhesive film were evaluated. As a result, the glass transition temperature (Tg) was 125° C., and the elastic modulus was 3400 MPa at 35° C. In addition, the temperature for 5% by weight reduction (Td) was 400° C.

The adhesive film was pasted on a 42 alloy plate, and the adhesive film was bonded to the 42 alloy plate by pressing under a pressure of 5 MPa at 200° C. for 1 second. The adhesive strength was determined. As a result, the adhesive film exhibited an adhesive strength of 900 g/cm. The adhesive film was heated at 200° C. with a hot air dryer for one week, and thereafter the adhesive strength was determined. As a result, the adhesive film exhibited an adhesive strength of 35 g/cm.

In addition, only the adhesive film was heated at 200° C. with a hot air dryer for one week, and thereafter the flexibility was evaluated in the same manner as in Example 4. The results are shown in Table 1.

Next, the elastic modulus of the film at 35° C. was determined. The elastic modulus was 3400 MPa.

Comparative Example 2

A 500 mL four-necked flask equipped with a stirrer, a dropping funnel, a reflux condenser and a thermometer was charged with 100 g (0.57 mol) of tolylene diisocyanate commercially available from Takeda Chemical Industries, Ltd. under the trade name of Takenate 80, 100 g (0.10 mol) of a polyethylene glycol commercially available from SANYO CHEMICAL INDUSTRIES, LTD. under the product name of PEG-1000, 112.5 g of xylene and 37.5 g of cyclohexanone, and the urethanation was carried out at 100° C. for 3 hours.

After the solution was cooled to room temperature, the flask was charged with 0.883 g (4.59 mmol) of a carbodiimidation catalyst (3-methyl-1-phenyl-2-phospholen-1-oxide) and 6.4793 g (40.2 mmol) of p-isopropylphenyl isocyanate, and the mixture was stirred at 100° C. for 1 hour to carry out carbodiimidation, to give a reaction solution of polycarbodiimide. The solvents were removed from the reaction solution, to give a polycarbodiimide.

The IR spectrum of the resulting polycarbodiimide was determined. As a result, the carbodiimidation was confirmed on the bases of the observation of the absorption ascribed to carbodiimide group (2140 cm$^{-1}$) and the disappearance of the absorption ascribed to isocyanate group (2280 cm$^{-1}$).

The number-average molecular weight of the resulting polycarbodiimide was 5800.

Next, the resulting reaction solution of polycarbodiimide was coated on a copper foil having a thickness of 105 μm, and the coating was heated at 90° C. for 30 minutes, and then at 200° C. for 30 minutes, and dried, to give an adhesive film having an adhesive layer of 50 μm in thickness, made of the polycarbodiimide.

The thermal properties of the resulting adhesive film were evaluated. As a result, the glass transition temperature (Tg) was 120° C., and the elastic modulus was 980 MPa at 35° C. In addition, the temperature for 5% by weight reduction (Td) was 230° C.

The adhesive film was pasted on a 42 alloy plate, and the adhesive film was bonded to the 42 alloy plate by pressing under a pressure of 5 MPa at 200° C. for 1 second. The adhesive strength was determined. As a result, the adhesive film exhibited an adhesive strength of 650 g/cm. The adhesive film was heated at 200° C. with a hot air dryer for one week, and thereafter the adhesive strength was determined. As a result, the film exhibited a strength of 0 g/cm.

In addition, only the film was heated at 200° C. with a hot air dryer for one week. As a result, the film did not retain its original shape.

The physical properties of the polycarbodiimides obtained in Examples 1 to 6 and Comparative Examples 1 and 2 are shown in Table 1.

TABLE 1

| Ex. No. | Number-Average Molecular Weight (Mn) | Tg (° C.) | Td (° C.) | Physical Properties Just After Filming | | | Physical Properties of Film After Heating at 200° C. for one week | | |
|---|---|---|---|---|---|---|---|---|---|
| | | | | Flexural Modulus (MPa) | Adhesive Strength (g/cm) | Flexibility | Flexural Modulus (MPa) | Adhesive Strength (g/cm) | Flexibility |
| 4(1) | 6300 | 133 | 380 | 940 | 1500 | ○ | 1100 | 1420 | |
| 5(2) | 6000 | 129 | 390 | 42 | 1550 | ○ | 53 | 1490 | |

TABLE 1-continued

| | Number-Average Molecular Weight (Mn) | Tg (° C.) | Td (° C.) | Physical Properties Just After Filming | | | Physical Properties of Film After Heating at 200° C. for one week | | |
|---|---|---|---|---|---|---|---|---|---|
| | | | | Flexural Modulus (MPa) | Adhesive Strength (g/cm) | Flexibility | Flexural Modulus (MPa) | Adhesive Strength (g/cm) | Flexibility |
| 6(3) Comp. Ex. No. | 5400 | 120 | 395 | 17 | 1390 | o | 25 | 1350 | |
| 1 | 4800 | 125 | 400 | 3400 | 900 | o | 3400 | 35 | x |
| 2 | 5800 | 120 | 230 | 980 | 650 | o | Undeterminable | 0 | x |

It can be seen from the results shown in Table 1 that each of the polycarbodiimides obtained in Examples 4 to 6 (Examples 1 to 3) have low flexural modulus, and are excellent in adhesiveness, flexibility and heat resistance, as compared to the polycarbodiimides obtained in Comparative Examples 1 and 2.

Example 7

The reaction solution of the polycarbodiimide obtained in Example 1 was coated on a stripping agent-treated separator having a thickness of 50 μm, made of a polyethylene terephthalate film. The coating was heated at 90° C. for 30 minutes, and then at 150° C. for 30 minutes, to give an adhesive film having an adhesive film layer of 50 μm in thickness.

The adhesive strength of the adhesive film for a silicon chip was determined by the following method.

Specifically, the resulting adhesive film was stripped off and removed from the separator, and thereafter cut into squares of 3 cm×3 cm. This film was inserted between silicon chips (passivation: silicon nitride) diced into a size of 2 mm×2 mm×760 μm and a glass-epoxy resin substrate having a size of 3 cm×5 cm, and a load of 2.94 MPa was applied thereto at a temperature of 50° to 200° C. for 40 seconds by using a flip-chip bonder commercially available from Shibuya Kogyo K. K. under the trade name of DB 100. The shearing adhesive strength was determined in accordance with JIS K6852. The results are shown in Table 2.

Example 8

The same procedures as in Example 7 were carried out except for using the reaction solution of the polycarbodiimide obtained in Example 2 in place of the reaction solution of the polycarbodiimide obtained in Example 1, to give an adhesive film. The shearing adhesive strength of the adhesive film to the silicon chip was determined in the same manner as in Example 7. The results are shown in Table 2.

Example 9

The same procedures as in Example 7 were carried out except for using the reaction solution of the polycarbodiimide obtained in Example 3 in place of the reaction solution of the polycarbodiimide obtained in Example 1, to give an adhesive film. The shearing adhesive strength of the adhesive film to the silicon chip was determined in the same manner as in Example 7. The results are shown in Table 2.

Comparative Example 3

The same procedures as in Example 7 were carried out except for using the reaction solution of the polycarbodiimide obtained in Comparative Example 1 in place of the reaction solution of the polycarbodiimide obtained in Example 1, to give an adhesive film. The shearing adhesive strength of the adhesive film to the silicon chip was determined in the same manner as in Example 7. The results are shown in Table 2.

Comparative Example 4

The same procedures as in Example 7 were carried out except for using the reaction solution of the polycarbodiimide obtained in Comparative Example 2 in place of the reaction solution of the polycarbodiimide obtained in Example 1, to give an adhesive film. The shearing adhesive strength of the adhesive film to the silicon chip was determined in the same manner as in Example 7. The results are shown in Table 2.

TABLE 2

| Bonding Temp. (° C.) | Shearing Adhesive Strength (MPa) | | | | |
|---|---|---|---|---|---|
| | Example 7 | Example 8 | Example 9 | Comparative Example 3 | Comparative Example 4 |
| 50 | 3.5 | 3.7 | 4.0 | 0 | 0.8 |
| 100 | 10.2 | 10.4 | 10.6 | 0 | 2.2 |
| 150 | 24.9 | 22.8 | 24.9 | 8.9 | 10.4 |
| 200 | 35.8 | 34.2 | 37.6 | 12.5 | 13.8 |
| 250 | 40.2 | 39.7 | 40.5 | 18.9 | 19.8 |

It can be seen from the results shown in Table 2 that each of the adhesive films obtained in Examples 7 to 9 exhibits excellent adhesiveness in a wide temperature range of low temperatures to high temperatures, as compared to the adhesive films obtained in Comparative Examples 3 and 4.

Example 10

The reaction solution of the polycarbodiimide obtained in Example 1 was coated on a stripping agent-treated separator having a thickness of 50 μm, made of a polyethylene terephthalate film. The coating was heated at 150° C. for 30 minutes, to give an adhesive film for underfilling having an adhesive film layer of 100 μm in thickness. The temperature for 5% by weight reduction (Td) was 380° C.

A semiconductor device was produced by using the adhesive film for underfilling. Specifically, as shown in FIG.

2, a wiring circuit substrate 1 (glass-epoxy resin substrate having a thickness of 1 mm) provided with connecting electrodes 3 (material: solder, melting point: 260° C., shape: cylinder having a diameter of 150 μm and a height of 30 μm) were positioned.

Next, the adhesive film was heated and melted under the conditions of a heating temperature of 150° C., a load per one electrode of 0.98 N and a heating time of 1 minute. The melted resin was filled within the gap formed between the wiring circuit substrate 1 and the semiconductor element 5, and the connecting electrodes 2 are contacted with the connecting electrodes 3, to give a tentatively bonded semiconductor device.

Next, the resulting semiconductor device was thermosetted by heating at 150° C. for 60 minutes. As shown in FIG. 1, there were obtained twelve semiconductor devices, the gap of which was filled with the sealing resin 4.

Example 11

The same procedures as in Example 10 were carried out except for using the reaction solution of the polycarbodiimide obtained in Example 2 in place of the reaction solution of the polycarbodiimide obtained in Example 1, to give an adhesive film for underfilling. The temperature for 5% by weight reduction (Td) was 390° C. A semiconductor device was also produced in the same manner as in Example 10.

Example 12

The same procedures as in Example 10 were carried out except for using the reaction solution of the polycarbodiimide obtained in Example 3 in place of the reaction solution of the polycarbodiimide obtained in Example 1, to give an adhesive film for underfilling. The temperature for 5% by weight reduction (Td) was 395° C. A semiconductor device was also produced in the same manner as in Example 10.

Comparative Example 5

The same procedures as in Example 10 were carried out except for using the reaction solution of the polycarbodiimide obtained in Comparative Example 1 in place of the reaction solution of the polycarbodiimide obtained in Example 1, to give an adhesive film for underfilling. The temperature for 5% by weight reduction (Td) was 400° C. A semiconductor device was also produced in the same manner as in Example 10.

Comparative Example 6

The same procedures as in Example 10 were carried out except for using the reaction solution of the polycarbodiimide obtained in Comparative Example 2 in place of the reaction solution of the polycarbodiimide obtained in Example 1, to give an adhesive film for underfilling. The temperature for 5% by weight reduction (Td) was 230° C. A semiconductor device was also produced in the same manner as in Example 10.

Electric conductivity of the semiconductor devices obtained in Examples 10 to 12 and Comparative Examples 5 and 6 were examined at 25° C. (initial electric conductivity).

Next, each of the six semiconductor devices obtained in each of Examples and Comparative Examples was subjected to 500 cycles of a thermal shock test (hereinafter referred to as "TST;" test conditions: one cycle comprising a treatment of keeping at −55° C. for 5 minutes and heating at 125° C. for 5 minutes). Thereafter, the electric conductivity of the semiconductor devices was examined (electric conductivity after TST). Also, generation of cracks in the semiconductor element was confirmed. The results are shown in Table 3.

In addition, each of other six semiconductor devices obtained in each of Examples and Comparative Examples was subjected to a pressure cooker test (hereinafter referred to as "PCT;" test conditions: allowing to stand for 168 hours in an atmosphere of a temperature of 121° C. and relative humidity of 100%), without carrying out a TST. Thereafter, the electric conductivity of the other six semiconductor devices obtained in each of Examples and Comparative Examples was examined. The results are also shown in Table 3.

On the other hand, the adhesive film for underfilling obtained in each of Examples and Comparative Examples was heated under the conditions of 150° C. for 60 minutes, to give a cured product. The tensile elastic modulus of each cured product was determined at 35° C. The results are shown in Table 3.

TABLE 3

| Test Items | Examples | | | Comparative Examples | |
|---|---|---|---|---|---|
| | 10 | 11 | 12 | 5 | 6 |
| Tensile Elastic Modulus (MPa) | 940 | 42 | 17 | 3400 | 980 |
| Temperature for 5% by Weight Reduction Td (° C.) | 380 | 390 | 395 | 400 | 230 |
| Initial Electric Conductivity (number of electrodes being not electrically connected per 12 electrodes) | 0/12 | 0/12 | 0/12 | 0/12 | 0/12 |
| Electric Conductivity After TST (number of electrodes being not electrically connected per 6 electrodes) | 0/6 | 0/6 | 0/6 | 4/6 | 3/6 |
| Generation of Cracks in Chips After TST(number of chips cracked per 6 chips) | 0/6 | 0/6 | 0/6 | 4/6 | 2/6 |
| Electric Conductivity After PCT (number of electrodes being not electrically connected per 6 electrodes) | 0/6 | 0/6 | 0/6 | 2/6 | 4/6 |

It can be seen from the results shown in Table 3 that the semiconductor devices obtained in Examples 10 to 12 had no electrically unconnected electrodes or no cracked chips generated in all of the test items.

On the other hand, the semiconductor devices obtained in Comparative Examples 5 and 6 had many faults in the test items.

Therefore, it is ensured that the semiconductor devices obtained in Examples 10 to 12 surely have stable electric conductivity against stress tests such as TST and PCT.

In addition, since the adhesive films obtained in Examples 10 to 12 have low tensile elastic moduli and high temperatures for 5% by weight reduction, and are excellent in heat resistance, the adhesive films can be favorably used as adhesive film for underfilling.

Since the polycarbodiimide of the present invention is excellent in various physical properties such as low elastic modulus, high heat resistance, low hygroscopicity and low dielectric constant, the polycarbodiimide can be favorably used as films, adhesives, and molded products. Especially, the polycarbodiimide of the present invention can be favorably used as adhesive for electronic parts, from the viewpoints of its low elastic modulus and high heat resistance.

As to the adhesive film for die bonding of the present invention, an adhesive layer which is uniform in thickness, shape and the like can readily be formed on electrodes, and fixed at low temperatures such as ambient temperature, so that maintenance of its quality is facilitated. Furthermore, since the adhesive film for die bonding of the present invention can be subjected to firm bonding treatment of the semiconductor chips without necessitating high temperatures and high pressures, the adhesive film has high heat resistance which withstands subsequent steps of wire bonding connection and resin molding sealing.

Since the semiconductor device of the present invention comprises a semiconductor chip and electrodes, wherein the semiconductor chip and the electrodes are firmly bonded with the adhesive film for die bonding, stresses generated in the wire circuit substrate, the semiconductor element and the connecting electrodes can be relaxed. Therefore, the semiconductor device of the present invention exhibits effects of reducing warping of the wire circuit substrate and the semiconductor element, preventing generation of the cracks in the semiconductor element, and improving reliability in electric connection with the connecting electrodes mounted on the wire circuit substrate.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polycarbodiimide represented by the formula (I):

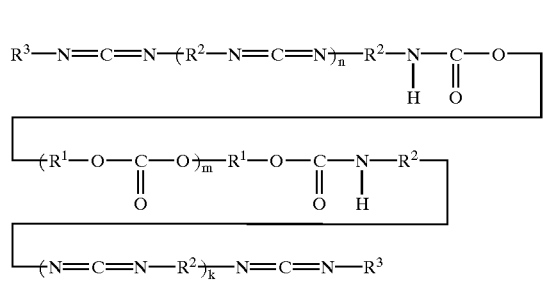

wherein $R^1$ is an alkylene group having 2 to 10 carbon atoms, $R^2$ is a divalent aromatic group, $R^3$ is a monovalent aromatic group, k is 0 or an integer of 1 to 30, m is an integer of 2 to 100, and n is 0 or an integer of 1 to 30.

2. The polycarbodiimide according to claim 1, wherein $R^1$ is alkylene group having 3 to 8 carbon atoms.

3. The polycarbodiimide according to claim 2, wherein $R^1$ is hexamethylene group.

4. The polycarbodiimide according to claim 1, wherein $R^2$ is a group represented by the formula (III):

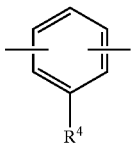

wherein $R^4$ is an alkyl group having 1 to 4 carbon atoms or an alkoxy group having 1 to 4 carbon atoms, a group represented by the formula (IV):

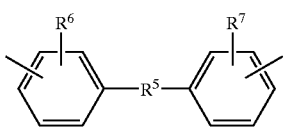

wherein $R^5$ is an alkylene group having 1 to 4 carbon atoms or oxygen atom, and each of $R^6$ and $R^7$ is independently hydrogen atom, an alkyl group having 1 to 4 carbon atoms or an alkoxy group having 1 to 4 carbon atoms, a group represented by the formula (V):

(V)

wherein X is a group represented by the formula (VI):

(VI)

wherein each of $R^8$ and $R^9$ is independently an alkyl group having 1 to 4 carbon atoms which may have a halogen atom, or a linear or branched alkylene group having 3 to 6 carbon atoms.

5. The polycarbodiimide according to claim 4, wherein $R^2$ is a group represented by the formula:

, or a group represented by the formula:

6. The polycarbodiimide according to claim 1, wherein $R^3$ is a group represented by the formula (VII):

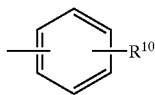

(VII)

wherein $R^{10}$ is an alkyl group having 1 to 6 carbon atoms.

7. The polycarbodiimide according to claim 6, wherein $R^3$ is a group represented by the formula:

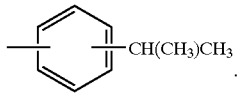

8. A film made of the polycarbodiimide of claim 1.

9. An adhesive film for die bonding, made of the polycarbodiimide of claim 1.

10. A semiconductor device comprising a semiconductor chip and an electrode, wherein the semiconductor chip is bonded to the electrode with the aid of the adhesive film of claim 9.

11. An adhesive film for underfilling, made of the polycarbodiimide of claim 1.

12. A semiconductor device comprising a semiconductor element and a wiring circuit substrate, wherein a gap formed between the semiconductor element and the wiring circuit substrate is sealed with the adhesive film of claim 11.

13. A process for preparing a polycarbodiimide represented by the formula (I):

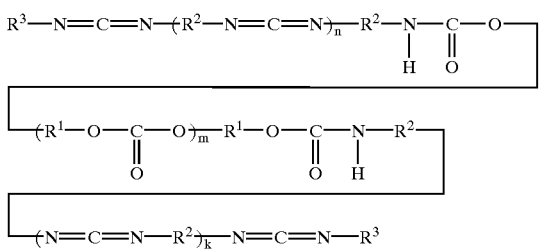

wherein $R^1$ is an alkylene group having 2 to 10 carbon atoms, $R^2$ is a divalent aromatic group, $R^3$ is a monovalent aromatic group, k is 0 or an integer of 1 to 30, m is an integer of 2 to 100, and n is 0 or an integer of 1 to 30, comprising the steps of:

reacting a polycarbonate diol represented by the formula (II):

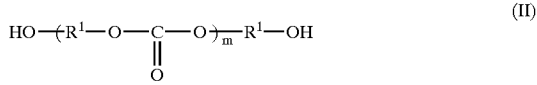

wherein $R^1$ and m are as defined above, with an aromatic diisocyanate in the ratio of not less than 2 mol of the aromatic diisocyanate per one mol of the polycarbonate diol to give a polyurethane having isocyanate groups at both ends; and carbodiimidating isocyanate groups existing at both ends of the resulting polyurethane with the residual aromatic diisocyanate in the presence of a catalyst.

* * * * *